Aug. 7, 1962 A. LORO 3,048,093

APPARATUS FOR MULTIPLE REGISTRATION OF A MASTER PATTERN

Filed June 15, 1960 2 Sheets-Sheet 1

Inventor
A. LORO
By Robert M. Harmon
Attorney

APPARATUS FOR MULTIPLE REGISTRATION OF A MASTER PATTERN

Filed June 15, 1960 2 Sheets-Sheet 2

Inventor
A. LORO
By Robert B. Harmon
Attorney

United States Patent Office 3,048,093

Patented Aug. 7, 1962

3,048,093
APPARATUS FOR MULTIPLE REGISTRATION OF A MASTER PATTERN

Alberto Loro, Ville Lemoyne, Quebec, Canada, assignor to Northern Electric Company Limited, a corporation of Canada Filed June 15, 1960, Ser. No. 36,385
2 Claims. (Cl. 95—77)

This invention relates to photo-printing and more particularly to an apparatus for accurately printing any desired small pattern in a plurality of positions on a large photographic plate.

In the fabrication of semi-conductor devices, for economical reasons it is becoming common practice to construct a large number of devices on a single piece of semiconductor material, the piece of material being later subdivided to produce the separate devices at as late a stage in manufacture as practicable.

In this way, any one of manufacturing operations such as the localized removal of oxide masking materials, the localized introduction of impurities to modify electrical properties of the material, the deposition of metal contacts by vacuum evaporation or spraying and the application of masking materials to permit localized etching can be carried out simultaneously at all locations on the piece of semiconductor material. These operations are achieved by the use of miniature masks and stencils which restrict the deposition or removal of materials from accurately defined positions in the semi-conductor surface. Thus for the deposition of metal contacts or of wax etching resists, metal foil stencils are required having the necessary number of apertures through which the material is deposited into the semi-conductor surface. Similarly for the photoengraving of an oxide mask on the surface of a semi-conductor, a photographic negative consisting of the necessary number of opaque areas on a clear background is required. If these various operations are to be carried out consecutively in exact register in the semiconductor surface, it is clear that the masks and photographic negatives also must be capable of exact register with one another.

Well known photographic techniques are utilized for the preparation of these masks and stencils by photographing large drawings of the required patterns on a reduced scale. Since acceptable errors of registration may be in the order of 0.0001 inch, it is apparent that the drawings must be produced with great care on a much enlarged scale if the necessary accuracy is to be achieved. Also, as it may be desirable to prepare between 100 and 1000 devices on each piece of semi-conductor material it is evident that the master drawings involve a considerable degree of skilled drafting labour.

It is therefore an object of this invention to describe a machine whereby the equivalent of these master drawings is produced by multiple printing of a photographic negative of a much simpler drawing. Only one simple pattern must be drawn and this can be drawn to a very large scale for high accuracy.

Because of the great accuracy of the machine, the completed master plate is much smaller than a master drawing needs to be in the order of 10 times the actual stencil size versus 100 times for the drawing. Also a photographic plate is dimensionally more stable and permanent than a drawing could be, using conventional drawing materials.

Prior art machines referred to in the art as "Step and Repeat" machines are not designed for the degree of precision required for purposes set forth in this invention. These machines primarily are designed to prevent waste of material or to produce good printing contact rather than for precise reproduction of position.

For example, some prior art machines use many restraints to achieve registration which invariably leads to ambiguity of position. Others use indents that are adjustable and are therefore not perfectly reproducible in location.

Accordingly it is another object of this invention to describe a high precision step and repeat machine that utilizes kinematic design principles which provide that six and only six restraints are required to fix the position of any movable part relative to a fixed frame of reference.

Another object of this invention is to provide a step and repeat machine whereby the precision of the machine is independent of the accuracy of machining of parts since it is precise reproduction of position rather than absolute position that is important for good registration.

A further object of this invention is to provide for the longitudinal and transverse slide systems to have their motion entirely independent of each other, thus preventing the adjustment of one from disturbing the other.

Still a further object of this invention is to describe a step and repeat machine that is rugged, inexpensive and stable, requiring a minimum of adjustment to account for wear.

These and other objects of this invention are attained in one embodiment of the invention by providing a step and repeat machine consisting of a base frame on which is mounted a plate carrier, having means to make it movable in the longitudinal direction, a rigid bridge located above the plate carrier having its position uniquely defined with respect to the base frame, a negative carrier mounted on the bridge and having means to make it movable in the transverse direction, a negative mounting plate supported by the negative carrier, the positions of the plate carrier, bridge negative carrier and negative mounting plate with respect to the base frame being accurately defined by six restraints resulting from the use of V blocks, rods, steel balls and planes in accordance with kinematic design principles.

Other objects and advantages of this invention will become apparent in the following detailed description when read with reference to the accompanying drawings where like numbers refer to like parts and in which.

Figure 1:
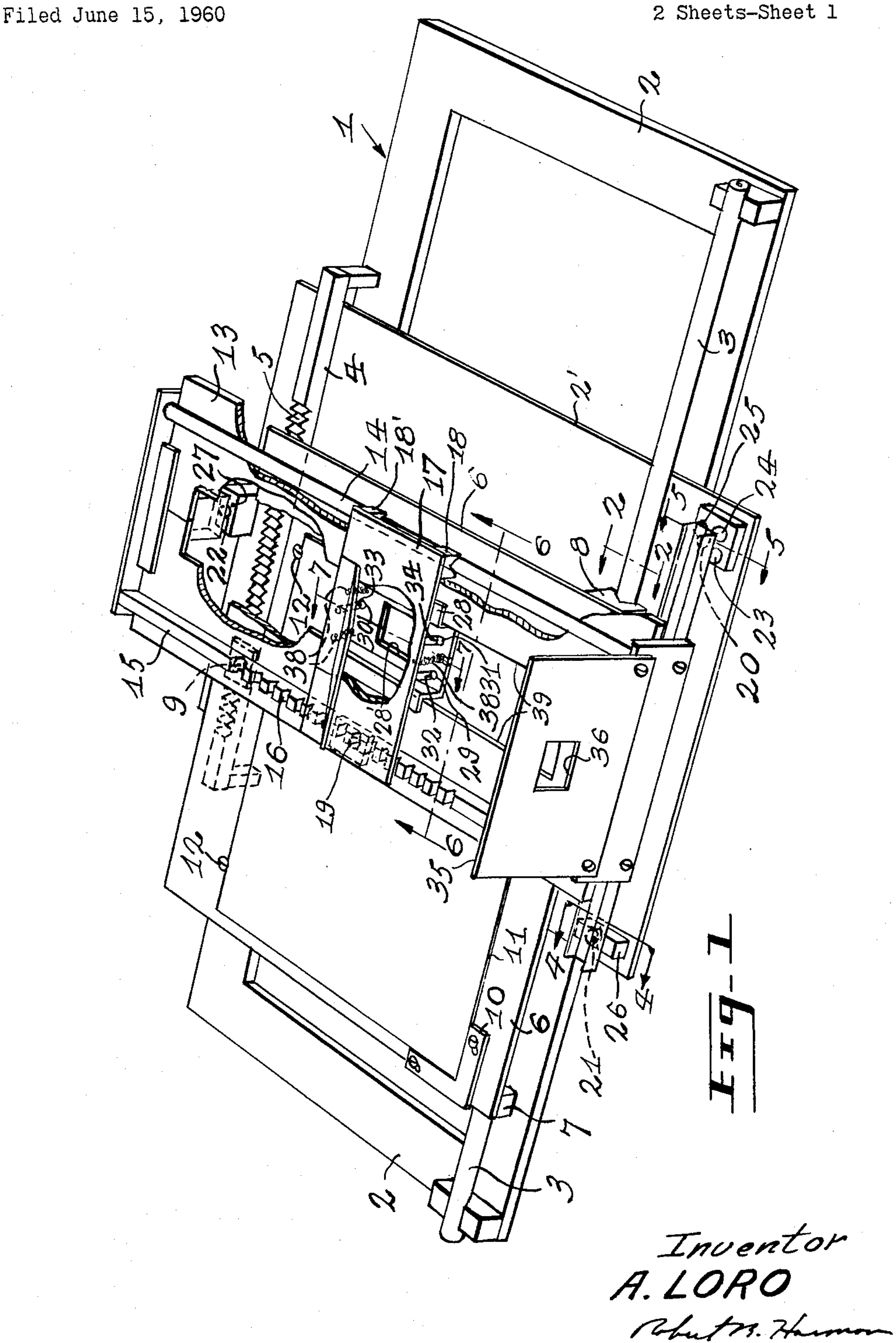
FIG. 1 is a perspective view of the macine of this invention with parts broken away for the purpose of clarity.
Figure 2:
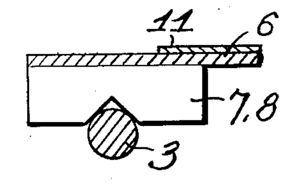
FIG. 2 is a section taken along line 2—2 of FIG. 1 showing details of one of the positions of restraint between the plate carrier and the base frame.
Figure 3:
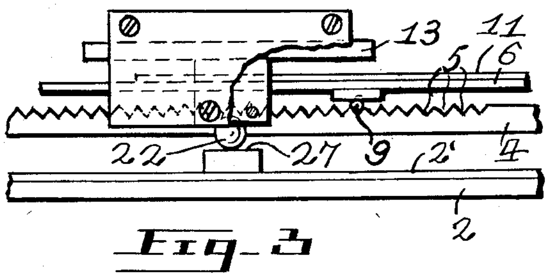
FIG. 3 is a partial rear elevation view showing details of one of the positions of restraint between the plate carrier and the base frame and between the bridge and the base frame.
Figure 4:
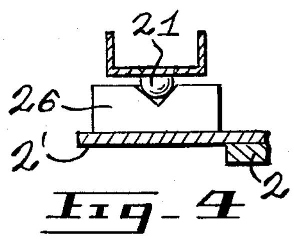
Figure 5:
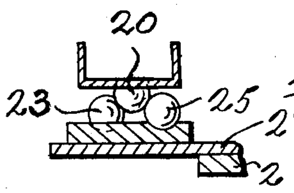
Figure 6:
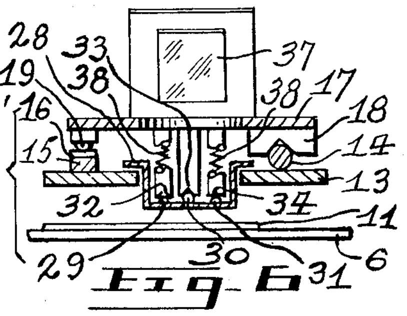
Figure 8:
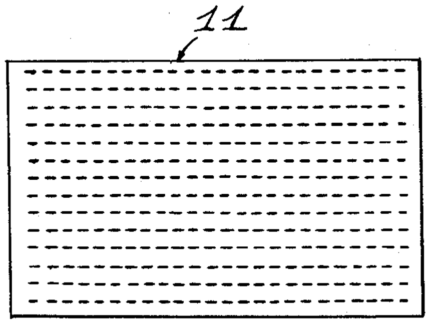
Figure 7:
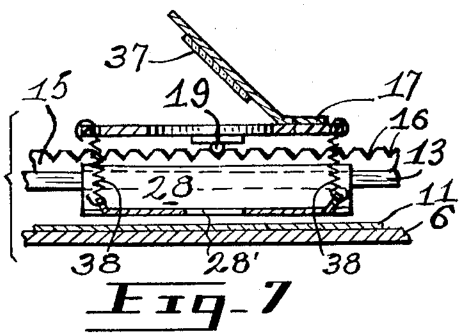
Figure 9:
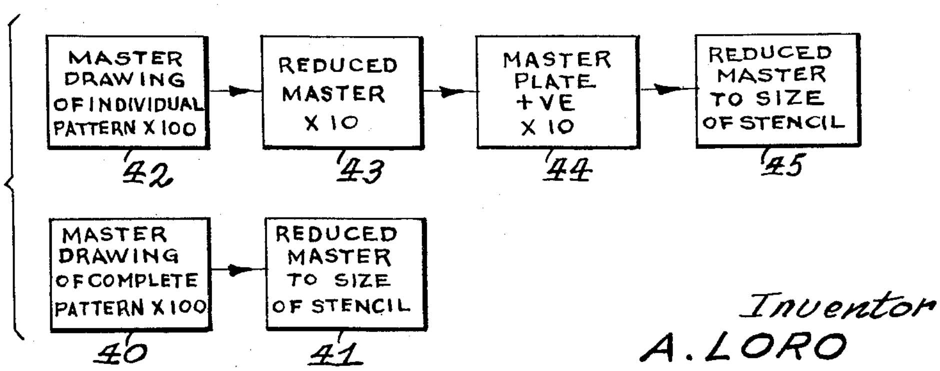

FIGS. 4 and 5 are sections respectively taken along lines 4—4 and 5—5 of FIG. 1 showing details of positions of restraint between the bridge and the base frame;

FIGS. 6 and 7 are sections respectively taken along lines 6—6 and 7—7 of FIG. 1 showing details of the negative carrier and the negative mounting plate;

FIG. 8 is an example of a photographic plate produced by the machine of this invention; and FIG. 9 is a block diagrammatic view showing the different stages in preparing the master plate according to this invention compared to a method commonly used in the art.

Referring to the drawings, there is shown in FIGS. 1 to 7 a base frame 1 consisting of a horizontal rectangular welded angle iron frame 2, and a base plate 2', the angle iron frame 2 having rigidly attached to the top surface thereof along the length of one long side a cylindrical steel rod 3 having a fine machined surface, and similarly attached to the top surface thereof along the length of the other long side a rectangular steel register bar 4 having cut in its top surface at 90 degrees to its length a plurality of equally spaced 90 degree grooves 5. The axis of the rod 3 defines the longitudinal direction of motion.

Also shown is a plate carrier 6 arranged to slide along the rod 3 on two widely spaced V blocks 7 and 8 (FIG. 2) attached to its underside near to one edge. Near the opposite end of the plate carrier 6 a steel sphere 9 (FIG. 3) is rigidly mounted to its underside, this steel sphere being arranged to engage one of the grooves 5 of the register bar 4. The plate carrier 6, therefore, may be moved in the longitudinal direction and may be stopped at a number of equally spaced locations along the rod 3 as the steel sphere is moved from one groove 5 to another. At each location, the plate carrier 6 is subject to six restraints, two points of contact between each V block 7 and 8 and the rod 3, and two points of contact between the sphere 9 and a groove 5. Hence each location is uniquely defined and can be reproduced precisely.

Plate carrier 6 is provided with a suitable clip 10 to hold a photographic plate 11 against three studs 12 (only two shown) on its upper surface. The object of the clip 10 and studs 12 is to hold the plate 11 securely to the plate carrier 6 during the printing operation, the exact relative position of plate 11 being immaterial. Thus the photographic plate 11 may be moved in the longitudinal direction and brought to rest at a series of equally spaced, reproducible locations.

Also shown located above plate carrier 6 is a bridge 13 having rigidly attached to the top surface thereof a second cylindrical steel rod 14 and a second rectangular steel register bar 15 having cut in its top surface at 90 degrees to its length a plurality of equally spaced 90 degree grooves 16. The axis of rod 14 defines the transverse direction of motion. In a similar manner to plate carrier 6, a negative carrier 17 (FIGS. 6 and 7) is arranged respectively to slide along rod 14 on V blocks 18 and 18′ and to engage grooves 16 of bar 15 by means of a steel sphere 19 rigidly attached to its underside. The negative carrier 17 also is subject to six restraints in an identical manner as the plate carrier 6 but on a smaller scale and therefore can be removed and replaced in precisely the same position relative to the base frame 1. The bridge 13 is located at such a height that a negative mounting plate 28, to be described in more detail hereinafter, supported by negative carrier 17 can move through a rectangular channel 39 in the bridge 13 close to the upper surface of plate 11.

In the embodiment shown in the drawings the bridge 13 can be removed and relocated in precisely the same position with respect to the base frame 1 by subjecting the bridge to six restraints consisting of three steel spheres 20, 21 and 22 rigidly mounted on the under surface of bridge 13 respectively engaging a cluster of three steel spheres 23, 24, 25, (FIG. 5), a V block 26 (FIG. 4) and a horizontal plane surface 27 (FIG. 3), all of which are rigidly mounted on the upper surface of the base plate 2′. In this embodment of the invention the bridge 13 is removable only to facilitate the insertion and removal of photographic plate 11. It should be understood that without departing from the scope of this invention, the bridge 13 can be rigidly fastened to the base plate 2′ by any suitable means providing of course that it is located at 90 degrees with respect to the base frame 1.

A photographic negative (not shown) is affixed to the underside of a detachable mounting plate 28 (FIGS. 6 and 7) over an aperture 28′ thereby by means of paraffin wax. The detachable mounting plate 28 is supported by springs 38 beneath the negative carrier 17 and is subject to six restraints to define its position by three steel spheres 29, 30 and 31 rigidly mounted on the upper surface of the mounting plate 28 respectively engaging a conical hole 32, a V groove 33 and a horizontal plane surface 34 all of which are suitably mounted to the under surface of the negative carrier 17. In this case the conical hole provides the equivalent of three restraints (of course a cluster of three steel spheres also could be read). In this embodiment of the invention the mounting plate 28 is detachable only to facilitate the insertion of the negative. It should be understood that without departing from the scope of this invention, the mounting plate 28 can be rigidly fastened to the negative carrier 17 by any suitable means. The bridge 13 has located at the front end a light baffle 35 having a rectangular aperture 36 located therein. Located on the upper surface of the negative carrier 17 is a 45 degree mirror 37 (FIGS. 6 and 7) such that a horizontal beam of light striking the mirror 37 through the aperture 36 of the baffle 35 is reflected vertically downwards through the negative and on to the photographic plate 11. If a collimated beam of light is used the intensity reaching the plate 11 is independent of the position of the negative carrier 16 along the transverse slide direction and the image of the negative on the plate will be sharp and dimensionally accurate. It will be apparent from the foregoing that by using a stationary collimated light source the negative can be repeatedly printed on to the photographic plate 11 in a rectangular array, the total number of images being XY, where X and Y respectively are the number of grooves 5 and 16 in the register bars 4 and 15.

In describing the operation of the machine it is assumed that a series of plates 11 are to be prepared each being capable of having accurate registration with the other.

A negative prepared by photographing a master drawing on a reduced scale and said negative having one or more images thereon is mounted to the underside of the negative mounting plate 28 over aperture 28′ with the emulsion side of the negative away from the plate 11, using paraffin wax.

Final positional adjustments can be made under a low power microscope while the wax is still slightly plastic. The machine is placed on a horizontal, vibration free work bench and the base frame 1 is checked for wobbles and levelled by means of shims if necessary. A microscope lamp adjusted for parallel light and located at a distance of approximately 8 to 10 feet in front of the machine is found to be a suitable light source. All extraneous light should be excluded by suitable baffles arranged between the light source and the machine.

The negative carrier 17 with negative mounted is placed on the bridge 13 at one extreme position on the transverse slide arrangement. With the bridge 13 removed from the base plate 2′ the photographic plate 11 is placed, emulsion side up on the plate carrier 6 using the clip 10 and the three studs 12 to secure the plate 11 in position. The plate carrier 6 is moved to an extreme position on the longitudinal slide arrangement. The bridge 13 is replaced on the base plate 2′. A black card (not shown) can be used manually as a shutter by placing it in front of the aperture 36 in the light baffle 35. The printing light is left on throughout the printing operation and all exposures are controlled by removing and replacing the card shutter. After each exposure, the negative carrier 17 is moved one groove 16 on the register bar 15 until a full row in the transverse direction has been completed. The negative carrier 16 is then returned to its starting position. The plate carrier 6 is then moved to successive grooves 5 on the register bar 4 and the transverse printing procedure is repeated at each step until a transverse row has been printed for every groove 5 on the register bar 4. To facilitate movement of the plate carrier 6, the bridge 13 can be lifted slightly to increase the clearance between the negative and the plate 11. Additional plates having different patterns can then be prepared in the same manner and each will be capable of exact register with one another. An example of a completed pattern on a plate 11 using a negative bearing a rectangular image and arranged in an array is shown in FIG. 8, each tiny rectangle representing an ultimate semi-conductor device.

The following is a brief description of an improved method in one stage of the preparation of stencils in the fabrication of semi-conductor devices. FIG. 9 shows in block diagrammatic form a comparison between a well known method of preparing master patterns for stencils and the method made possible by the use of the machine of this invention. As shown, in the known method a complete pattern 40 is drafted on an enlarged scale and successively photographed down 41 to the size of the stencil. This master drawing 40 becomes very bulky and laborious to construct and may not be very stable in its dimensions. Furthermore the photographic lens has to cover the whole area of the drawing with a very high degree of resolution and this is very difficult using a large drawing that may be several feet wide. In the method used by this invention, a single pattern 42 accurately drawn to a scale of ×100 and photographically reduced to ×10, 43, is then applied to the machine to produce a master plate 44 having the complete pattern thereon and being 10 times the actual stencil size which can then be reduced photographically to its final size, 45.

What is claimed is:

1. In a contact printing machine, in combination:

(*a*) a base frame, (*b*) a cylindrical rod and a rectangular register bar spaced transversely and positioned parallel to each other mounted in said frame, the register bar having cut in its upper surface a plurality of equally spaced 90 degree V shape grooves at 90 degrees to the length of the bar, (*c*) a plate carrier mounted to travel in the longitudinal direction on said rod and bar, each location of said plate carrier being accurately reproducible through direct contact between said plate carrier and said frame at six points of restraint, (*d*) a rigid bridge, mounted at 90 degrees to said frame and located above said plate carrier, removable from the frame and which can be replaced on the frame in a unique position by providing six restraints thereto consisting of three steel spheres rigidly mounted on the under surface of said bridge and arranged to respectively engage a cluster of three steel spheres, a V block and a plane surface rigidly mounted on the upper surface of the frame, (*e*) a second cylindrical rod and rectangular register bar spaced longitudinally and positioned parallel to each other mounted on said bridge, the register bar having cut in its upper surface a plurality of equally spaced 90 degree V shape grooves at 90 degrees to the length of the bar, (*f*) a negative carrier mounted to travel in the transverse direction on said second rod and bar, each location of said negative carrier being accurately reproducible through direct contact between said negative carrier and said bridge at six points of restraint, (*g*) a negative mounting plate attached to the underside of said negative carrier such that a negative mounted thereon can move close to the upper surface of a photographic plate mounted on said plate carrier.

2. A contact printing machine as defined in claim 1 in which said negative mounting plate is detachable from said negative carrier and can be replaced on the carrier in a unique position by providing six restraints thereto consisting of three spherical steel feet mounted on the upper surface of said mounting plate and arranged to respectively engage a V groove, a plane surface and a conical shaped hole mounted on the under surface of the carrier.

References Cited in the file of this patent

UNITED STATES PATENTS

| | | |
|---|---|---|
| 1,847,010 | Koppe | Feb. 23, 1932 |
| 2,279,949 | McCrum | Apr. 14, 1942 |
| 2,351,753 | Flint | June 20, 1944 |
| 2,459,552 | Stoner | Jan. 18, 1949 |
| 2,770,165 | Vriezelaar | Nov. 13, 1956 |